United States Patent [19]

Petrole et al.

[11] Patent Number: 5,700,523
[45] Date of Patent: Dec. 23, 1997

[54] METHOD FOR TREATING METAL SURFACES USING A SILICATE SOLUTION AND A SILANE SOLUTION

[75] Inventors: Anthony P. Petrole, Ashland; José B. Rivera, Philadelphia, both of Pa.

[73] Assignee: Bulk Chemicals, Inc., Leesport, Pa.

[21] Appl. No.: 657,352

[22] Filed: Jun. 3, 1996

[51] Int. Cl.⁶ .................................... C23C 22/34
[52] U.S. Cl. .............. 427/397.8; 148/243; 148/247; 148/251; 427/409
[58] Field of Search ............... 427/409, 397.8; 148/247, 251, 243

[56] References Cited

U.S. PATENT DOCUMENTS

| | | | |
|---|---|---|---|
| 4,783,224 | 11/1988 | Sako | 148/247 |
| 4,921,552 | 5/1990 | Sander | 148/247 |
| 5,108,793 | 4/1992 | van Ooij et al. | |
| 5,200,275 | 4/1993 | Ooij | 428/623 |
| 5,393,353 | 2/1995 | Bishop | |
| 5,433,976 | 7/1995 | Ooij | 427/327 |
| 5,478,655 | 12/1995 | Sabata | 428/469 |

FOREIGN PATENT DOCUMENTS

WO 94/12570  6/1994  WIPO.

OTHER PUBLICATIONS

"Powder coat vs. electrocoat evaluated by custom finisher," Article from Modern Metals., (pp. 36, 38, 40).

Primary Examiner—Sam Silverberg
Attorney, Agent, or Firm—Ratner & Prestia

[57] ABSTRACT

A method for treating a metal surface involves contacting the metal surface with an aqueous silicate solution, contacting the silicate-coated metal surface with an aqueous organo-functional silane solution, and then contacting the silane-coated metal surface with a chrome-free pretreatment. Preferably, the bath containing the aqueous silicate solution also includes a cleaning agent for cleaning the metal surface. Alternatively, the metal surface may be cleaned in a separate step before the metal surface is contacted with the aqueous silicate solution and, optionally, the metal surface is rinsed with water after the metal surface is cleaned and before the metal surface is contacted with the aqueous silicate solution. The silicate-coated metal surface may be rinsed with water before it is contacted with an aqueous organo-functional silane solution. In addition, the silane-coated metal surface may be rinsed with water before it is contacted with a chrome-free pretreatment. As an alternative or in addition to these rinsing steps, excess solution may be removed from the silicate-coated or silane-coated metal surface prior to the subsequent steps. Preferably, the aqueous silicate solution includes water and either sodium silicate or potassium silicate, and the aqueous organo-functional silane solution comprises an aminopropyl silane and water.

10 Claims, No Drawings

METHOD FOR TREATING METAL SURFACES USING A SILICATE SOLUTION AND A SILANE SOLUTION

FIELD OF THE INVENTION

The present invention pertains to treating metal surfaces to improve the corrosion resistance of metal surfaces and to improve the adhesion of subsequently applied decorative finishes, such as paint, to metal surfaces.

BACKGROUND OF THE INVENTION

Before chromium was recognized as environmentally hazardous, compositions containing chromium were used as coatings to improve the corrosion resistance and paint adhesion of metals. Chromium chromate and chromium phosphate were two compounds typically used as coatings for metal. Recent developments led to the use of chrome-free coatings, or "pretreatments," which typically include a polymeric resin and a fluo or oxy-fluo form of group IV-B elements of the periodic table (e.g., titanium, zirconium, and hafnium). These chrome-free pretreatments provide surface coatings whose compositions are based on the products of the interaction between the metallic substrate and the pretreatments.

Before exposing a metal surface to a chrome-free pretreatment, the metal surface must typically be cleaned to remove any contaminants which might interfere with the pretreatment process or subsequent processing. Various methods for cleaning metal surfaces have been used. The particular cleaner selected is important in that it is desirable to have a strong cleaning agent to adequately remove any residual oil or dirt from the metal surface, but it is undesirable to cause over-etching of the metal surface. Cleaning and pretreating metal surfaces in preparation for painting have traditionally been accomplished by the following steps:

1) Alkaline Clean—An aqueous solution of an alkaline-based cleaner of sodium or potassium hydroxide, optionally containing surfactants, sequestrants, and builders, is applied to the surface of the extrusion by known spray or dip methods;

2) Rinse—The metal surface having been contacted by the alkaline-based cleaning solution is rinsed with water, also by known spray or dip methods;

3) Pretreat—The metal surface is then exposed to a pretreatment, such as chromium phosphate, chromium chromate, zinc phosphate, iron phosphate, or chrome-free pretreatments, again by known spray or dip methods;

4) Rinse—The metal surface is then rinsed, again by known spray or dip methods, with water to remove residual pretreatment solution; and 5) Rinse—This stage is optionally used to ensure removal of any residues from step 3 above or to seal the surface with a desired final rinse compound, often chromate-based. Once again, the final rinse compound is applied to the meal surface by known spray or dip methods.

More recently, with the introduction of chrome-free pretreatments into the metal pretreatment market, the above steps could be modified to exclude the rinses (i.e., steps 4 and 5) after the pretreatment sage. Elimination of steps 4 and 5 is generally called "dried-in-place" technology.

The use of silanes as additives during the application of a pretreatment to a metal surface is known. For example, U.S. Pat. No. 5,393,353 discloses a method for preparing a black zinc-nickel alloy surface containing at least about 8% nickel in the alloy. In the method disclosed by this patent, the metal surface is contacted with an aqueous acidic solution of an inorganic acid, preferably phosphoric acid, and at least one silane. With the inclusion of at least one silane in the acidic solution, corrosion resistance is improved.

It is a goal of the present invention to provide a method which further improves the corrosion resistance and paint adhesion of metal surfaces. An additional goal according to an embodiment of the present invention is to reduce the number of stages required to accomplish the goals of improving corrosion resistance and paint adhesion of metal surfaces.

SUMMARY OF THE INVENTION

To achieve these and other objects, and in view of its purposes, the present invention provides a method for treating a metal surface to improve corrosion resistance and paint adhesion of the metal surface by first contacting the metal surface with a first bath of an aqueous silicate solution to form a silicate-coated metal surface. The silicate-coated metal surface is then contacted with a second bath of an aqueous organo-functional silane solution to form a silane-coated metal surface. The final step is to contact the silane-coated metal surface with a third bath which is a chrome-free pretreatment solution.

According to an embodiment of the present invention, the method further includes the step of rinsing the silicate-coated metal surface with water prior to the step of contacting the silicate-coated metal surface with the second bath. Alternatively, the method may include the step of removing excess aqueous silicate solution from the silicate-coated metal surface prior to the step of contacting the silicate-coated metal surface with the second bath. As yet another alternative, both steps of rinsing and removing excess solution from the metal surface may be carried out, in any order. Yet another embodiment involves the step of rinsing the silane-coated metal surface with water prior to the step of contacting the silane-coated metal surface with the third bath.

According to another embodiment of the present invention, the method further includes first cleaning the metal surface, to form a cleaned metal surface, prior to the step of contacting the metal surface with the first bath. Optionally, after this cleaning step, the cleaned metal surface may be rinsed with water prior to the step of contacting the cleaned metal surface with the first bath. As an alternative to having a separate cleaning step, the first bath includes a cleaning agent and the step of contacting the metal surface with a first bath includes cleaning the metal surface.

According to a preferred embodiment of the present invention, the metal surface is first contacted with a first bath, having a pH of at least about 8, which is an aqueous silicate solution consisting of water and either sodium or potassium silicate in a concentration of from about 1 gram/liter to 20 grams/liter, to form a silicate-coated metal surface. The silicate-coated metal surface is then contacted with a second bath which is an aqueous organo-functional silane solution consisting of water and an aminopropyl silane in a concentration of from about 1 gram/liter to 20 grams/liter. The resulting silane-coated metal surface is then contacted with a third bath having a chrome-free pretreatment consisting of the reaction product of a polymer system having hydroxyl and carboxylic functional groups and a compound of a group IV-B element.

It is to be understood that both the foregoing general description and the following detailed description are exemplary, but are not restrictive, of the invention.

DETAILED DESCRIPTION OF THE INVENTION

This invention provides a method for treating metal surfaces. The method for treating metal surfaces includes the following steps:

1) Silicate Deposition—The metal surface is contacted with a first bath which is an aqueous silicate solution to form a silicate-coated metal surface;

2) Silane Deposition—The silicate-coated metal surface is contacted with a second bath comprising an aqueous organo-functional silane solution to form a silane-coated metal surface;

3) Pretreatment/Final Sealing—The rinsed metal surface is contacted with a pretreatment, preferably a chrome-free pretreatment.

Typically, the metal surface which has been exposed to this treatment sequence is then dried and painted. All of the steps of the present invention may be accomplished by any known coating technique, including spray, immersion, roll coating, or flow coating techniques.

The first bath of the present invention is an aqueous silicate solution. As used in this application, the term "silicate" has its conventional meaning of any of the widely occurring compounds containing silicon, oxygen, and one or more metals, with or without hydrogen. Some exemplary silicates which can be used in connection with the present invention are sodium silicate and potassium silicate, although any silicate can be used in the method of the present invention. The first bath is made by mixing the selected silicate with water. Although the preferred concentration ranges depend on other factors, such as bath temperature, bath pH, and the method of application, a concentration range of from about 0.1 grams/liter to 100 grams/liter yields favorable results. Even more preferably, a concentration range of from about 1 gram/liter to 20 grams/liter yields even more favorable results. The pH of the first bath is preferably above 8, and even more preferably above 9. At a pH value of below about 9, certain silicates become insoluble at higher concentrations—which is undesirable.

An optional water rinse step may also be included between steps 1 and 2 listed above. In water rinse steps, the water is preferably deionized water. The use of deionized water avoids introducing any deleterious ions, such as chloride ions, into the system. An optional step of removing excess aqueous silicate solution from the silicate-coated metal surface may also be included between steps 1 and 2 listed above. These two steps of rinsing and removal of excess solution may be employed individually or may both be employed in either order, between steps 1 and 2.

The second bath of the present invention is an aqueous organo-functional silane. As used in this application, the term "silane" has the same meaning as defined in U.S. Pat. No. 5,393,353 to Bishop, which is incorporated herein by reference. The term "organo-functional silane" means a silane which includes an organic group (such as an alkyl, an aryl or an alkoxy group) and a functional group which serves to bond with or assist in bonding with polymers in the pretreatment or paint. Such functional groups include, but are not limited to, amino, epoxy, vinyl, and mercapto groups. Some exemplary organo-functional silanes which can be used in connection with the present invention are aminopropyltriethoxy silanes sold under the trademarks a mercapto silane sold under the trademark SILQUEST A-189 by OSi; and an epoxy silane sold under the trademark SILQUEST A-187 by OSi, although any organo-functional silane as defined above can be used in the method of the present invention. The second bath is made by mixing the selected organo-functional silane with water. Although the preferred concentrations depend on other factors, such as bath temperature, bath pH, and the method of application, a concentration range of from about 0.1 grams/liter to 100 grams/liter yields favorable results. Even more preferably, a concentration range of from about 1 gram/liter to 20 grams/liter yields even more favorable remits. The pH of the second bath depends on the nature of the particular organo-functional silane selected and can vary widely.

Yet another optional water rinse step may be performed between steps 2 and 3 listed above.

Pretreatment/Final Sealing step 3 involves contacting the rinsed metal surface with a pretreatment solution. Although the pretreatment is preferably a chrome-free pretreatment, any known chrome-containing pretreatment can also be used as the pretreatment in the present invention. As used herein, the term "chrome-free pretreatment" means any aqueous solution which improves the paint adhesion and corrosion resistance of a metal surface and which does not include chromium in any form. An exemplary chrome-free pretreatment which may be used in connection with the present invention is the composition of the assignee's co-pending patent application Ser. No. 08/112,890, filed on Aug. 27, 1993, and entitled A METHOD AND COMPOSITION FOR TREATING METAL SURFACES, which is incorporated herein by reference. The preferred chrome-free pretreatment of the present invention is defined in the '890 patent application, namely the reaction product of a polymer system having a plurality of hydroxyl and carboxylic functional groups and a compound containing a group IV-B element.

Such compounds containing a group IV-B element typically include acids or salts of Group IV-B elements. Such acids include hydrofluozirconic acid ($H_2ZrF_6$), fluotitanic acid ($H_2TiF_6$), and fluohafnic acid ($H_2HfF_6$). An exemplary salt of a Group IV-B element is ammonium zirconium carbonate. An ammonium zirconium carbonate solution sold by Magnesium Elektron Inc. under the trademark BACOTE 20, having a working empirical formula of $(NH_4)_2[Zr(OH)_2(CO_3)_2]+nH_2O$, may be used in connection with the present invention.

Another exemplary chrome-free pretreatment is the composition disclosed in Table 2 of the '890 patent application, which is an aqueous solution of polyacrylic acid, ammonium bifluoride, and a fluosurfactant. Another exemplary chrome-free pretreatment is the pretreatment disclosed in U.S. Pat. No. 4,191,596 to Dollman et al., which includes a fluo acid and a carboxylic polymer. Still another exemplary chrome-free pretreatment is the pretreatment disclosed in U.S. Pat. No. 5,129,967 to Sander et al., which includes dihydrohexafluozirconic acid, dihydrohexafluotitanic acid, polyacrylic acid, and hydrofluoric acid. Yet another exemplary chrome-free pretreatment which may be used in connection with the present invention is the pretreatment sold under the trademark OKEMCOAT™ by Oakite Products, Inc.

The method of the present invention, as listed in steps 1 through 3 discussed above, results in a metal surface having improved corrosion resistance and paint adhesion properties. It is believed that this result is caused by the complex formed by the interaction of the three layers formed on the metal surface by the first, second, and third baths. This complex is strongly bonded to the metal surface on one side and to a paint layer or other decorative layer on the other side. The inclusion of a silicate in the first bath serves to suppress etching of the metal surface and dissolution of the metal. In addition, the silicate apparently forms complexes with the metal surface. The silane layer bonds the subsequently applied organic layer (such as the pretreatment or the paint) to the silicate complexes formed at the metal surface or directly to the metal surface. Finally, the pretreatment serves to enhance bonding of the paint or other decorative layer to the metal surface or to complexes formed with the silicate and/or silane layers. In this way, corrosion resistance and paint adhesion are significantly improved.

Steps 1 through 3 listed above may be applied directly to a metal surface assuming that the metal surface is sufficiently clean. For example, if the stages of a production line are at a location near a galvanized steel processing plant, then the fresh galvanized steel would likely be sufficiently clean to be to have step 1 listed above applied directly. On the other hand, if the metal surface is not sufficiently clean, the metal surface may be cleaned, to form a cleaned metal surface, prior to the step of contacting the metal surface with the first bath. Any known cleaning bath can be used. A cleaning bath is typically an aqueous solution of a cleaning agent and, optionally, at least one surfactant and at least one builder, which functions as a source of alkali and as a dispersant. Exemplary builders are soda ash or a tripolyphosphate. A wide variety of known cleaning agents may be used, including, but not limited to, at least one of ammonium acid phosphate, ammonium hydroxide, phosphoric acid, or mono-ethanol amine. Preferably, an alkaline-based cleaning agent, such as potassium or sodium hydroxide, is used. Similarly, a wide variety of surfactants may be used in the cleaning bath, such as the surfactants disclosed in U.S. Pat. No. 4,370,173 to Dollman. The cleaning bath cleans the metal surface by removing oil and other contaminants from the metal surface.

The cleaning bath may have any appropriate pH suitable for the process conditions and compatible with the equipment. For example, if the equipment is mild steel which is prone to corrosion under acidic conditions, the pH of the cleaning bath should not be so low as to cause acid corrosion. The cleaning bath may be mildly acidic if ammonium acid phosphate is selected as the cleaning agent and, more specifically, may have a pH of from 2.0 to 3.5. Alternatively, the cleaning bath may be mildly alkaline if ammonium hydroxide is selected as the cleaning agent and, more specifically, may have a pH of from 7.0 to 9.0.

The concentration of the cleaning agent and the surfactant must be sufficient to remove substantially all oil and other contaminants from the metal surface, but must not be so high that a significant amount of foaming occurs. An optional water rinse step, similar to the optional water rinse steps discussed above, may be employed between the cleaning step and step 1 discussed above. Typically, this water rinse step is avoided if the cleaning bath is not too concentrated, which is acceptable in the event that the metal is initially relatively clean.

In a preferred embodiment of the present invention, the cleaning step is combined with the step of contacting the metal surface with the first bath by including a cleaning agent in the first bath. The other components discussed above in connection with the cleaning step, such as surfactants and builders, can also be included in the first bath. This embodiment results in the significant advantage of saving up to two stages along a pretreatment line.

The method of the present invention may be used on a wide variety of metals, including, but not limited to, aluminum and aluminum alloys, zinc and zinc alloys, iron and iron alloys, and combinations thereof.

The process steps can be operated at a wide range of temperatures. For example, the steps may be carried out at temperatures of from about 60° F. to 160° F., although there is no reason to believe that temperatures outside of this range will prevent the composition from having the desirable effects. Generally, a slight change in the temperature will not necessitate substantial alteration of the treating time, or concentrations or ratios of reactants. Preferably, the cleaning step is carried out at a slightly elevated temperature (i.e., at about 130° F. to 150° F.), in order to facilitate removal of soil and other contaminants, and the acid conditioning step is carried out at room temperature.

The time of treatment of a metal surface with the baths of the various steps need only be long enough to ensure complete wetting of the surface and can be as long as thirty minutes. The contact time between a substrate and solution should preferably be from approximately less than one second to about one minute.

EXAMPLES

The following examples are included to more clearly demonstrate the overall nature of the invention. These examples are exemplary, not restrictive, of the invention.

In examples 2 and 4 below, a variety of steel panels and sections were treated according to the method of the present invention. In comparative examples 1 and 3 below, steel panels and sections were treated according to known methods. In all of the examples, the metal samples were subsequently painted, cured, and then subjected to a commercially accepted test which reveals the corrosion resistance and paint adhesion of the treated metal surfaces. The test involved scribing the painted panels with an "X" pattern (corner to opposite corner) with a sharp blade to freshly expose the surface of the underlying metal. Following scribing, the panels were exposed to 400 hours of Neutral Salt Spray, which was performed in accordance with ASTM B-117, which provides for the operation of a salt spray solution containing a 5% aerated sodium chloride solution at 95° F. Each panel was placed above the solution and the salt solution was continuously misted into the air by a spray nozzle. Scribe and field ratings (with 10=no failure and 0=total failure) are reported below. The scribe rating measures the degree of expansion of creepage from a scribe. The "field rating" is a measure of blistering.

EXAMPLE 1

On a laboratory scale, hot-dipped galvanized (HDG) steel panels were cleaned in an alkaline-based cleaning solution sold as a concentrate under the trademark CHEMCLEAN™ by Chemfil. The concentrated cleaner was diluted to 5% to 10% by weight. The HDG steel panels were dipped for approximately one minute and at a temperature of approximately 150 ° F.

The panels were then rinsed with tap water for approximately 20 seconds and at a temperature of approximately 110° F. Next, the panels were treated with a zinc phosphate bath sold as a concentrate under the trademark CHEMPHOS™ by Chemfil for approximately one minute and at a temperature of approximately 150° F. The concentrate was diluted to 5%–10% by weight.

The panels were rinsed with tap water again for approximately 20 seconds and at a temperature of approximately 110° F. Next, the panels were treated with a chromium bath, for approximately 20 seconds and at a temperature of approximately 90° F., containing the following components in the following weight concentrations:

| COMPONENT | CONCENTRATION (g/l) |
|---|---|
| Chromium (hexavalent) | 0.2 |
| Chromium (trivalent) | 0.2 |

The panels were subsequently coated with a single coat of water-based paint, dried, then subjected to the salt spray test referred to above. The results of the tests are reported below in Table I.

EXAMPLE 2

On a laboratory scale, hot-dipped galvanized steel panels were treated with compositions consistent with the method of the present invention. Specifically, the panels were cleaned in the cleaning solution of Example 1 except that the cleaner bath additionally contained 2 grams/liter of potassium silicate. The panels were exposed to this bath for approximately one minute and at a temperature of approximately 150° F.

The panels were then rinsed with tap water for approximately 20 seconds and at a temperature of approximately 110° F. The panels were immediately treated with a silane-based bath containing the following ingredient and water:

| COMPONENT | CONCENTRATION (g/l) |
|---|---|
| gamma-aminopropyl-triethoxysilane | 1.0 |

Excess solution was then removed from the panels. The panels were then contacted with a pretreatment, for approximately 30 seconds and at a temperature of approximately 90° F., containing the following components in the following weight concentrations:

| COMPONENT | CONCENTRATION (g/l) |
|---|---|
| Polyvinyl alcohol | 0.73 |
| Polyacrylic acid | 1.14 |
| Fluosurfactant/Wetting Agent | 0.02 |
| Isopropyl alcohol | 0.08 |
| Ammonium Zirconium Carbonate | 2.20 |
| Fluoride | 0.01 |

The panels were subsequently coated with a single coat of the same water-based paint used in Example 1, dried, then subjected to the salt spray test referred to above. The results of the tests are reported below in Table I.

EXAMPLE 3

Solutions having the same concentrations as Example 1 were used to clean and treat hot-dipped galvanized steel strip. The line speed was approximately 10–15 feet per minute. All treatment stages apply working solutions through spray application. The metal strip was painted. Samples were cut from the finished sheet and subjected to the salt spray test referred to above. The results of the tests are reported below in Table I.

EXAMPLE 4

In order to ensure that the method of the present invention produced commercially acceptable metal samples, the method of the present invention was used to clean hot-dipped galvanized sections on the production line described in Example 3. More specifically, solutions having the same concentrations as Example 2 were used to clean and treat hot-dipped galvanized steel sections. The sections were painted, dried, then subjected to the salt spray test referred to above. The results of the tests are reported below in Table I.

TABLE I

| Panel/Section of Example Number: | Scribe Rating | Field Rating |
|---|---|---|
| 1 | 5 | 10 |
| 2 | 7 | 10 |
| 3 | 6 | 8 |
| 4 | 8 | 9 |

As can be seen from Table I, samples treated by the method of the present invention have improved corrosion resistance and paint adhesion as compared to samples treated by known methods. Specifically, in both the laboratory scale testing and production line testing, samples treated by the method of the present invention (Examples 2 and 4) scored two rating points better than the comparisons (Examples 1 and 3) in the scribe rating. Although the field ratings were similar in the laboratory scale testing (Compare Examples 1 and 2), the sample treated by the method of the present invention performed better in production line testing (Compare Examples 3 and 4).

Although illustrated and described herein with reference to certain specific embodiments and examples, the present invention is nevertheless not intended to be limited to the details shown. Rather, the claims should be read to include various modifications within the scope and range of equivalents of the claims, without departing from the spirit of the invention.

What is claimed is:

1. A method for treating a metal surface to improve corrosion resistance and paint adhesion of the metal surface, said method comprising the steps of:

contacting the metal surface with a first bath, having a pH of at least about 8 and comprising an aqueous silicate solution consisting of water and a compound selected from the group consisting of sodium silicate and potassium silicate in a concentration of from about 0.1 gram/liter to 100 grams/liter, to form a silicate-coated metal surface;

contacting the silicate-coated metal surface with a second bath, comprising an aqueous organo-functional silane solution consisting of water and an aminopropyl silane in a concentration of from about 0.1 gram/liter to 100 grams/liter, to form a silane-coated metal surface; and contacting the silane-coated metal surface with a third bath comprising a chrome-free pretreatment consisting of the reaction product of a polymer system having hydroxyl and carboxylic functional groups and a compound of a group IV-B element.

2. The method in accordance with claim 1 further comprising rinsing the silicate-coated metal surface with water prior to the step of contacting the silicate-coated metal surface with said second bath.

3. The method in accordance with claim 1 further comprising removing excess aqueous silicate solution from the silicate-coated metal surface prior to the step of contacting the silicate-coated metal surface with said second bath.

4. The method in accordance with claim 1, wherein the step of contacting the metal surface with a first bath includes cleaning the metal surface and said first bath further comprises a cleaning agent.

5. The method in accordance with claim 4, wherein said cleaning agent is an alkaline-based cleaner.

6. The method in accordance with claim 1 further comprising cleaning the metal surface, to form a cleaned metal surface, prior to the step of contacting the metal surface with said first bath.

7. The method in accordance with claim 6 further comprising rinsing the cleaned metal surface with water prior to the step of contacting the cleaned metal surface with said first bath.

8. The method in accordance with claim 1, wherein:
the concentration of said silicate in said first bath is from about 1 gram/liter to 20 grams/liter; and
the concentration of said silane in said second bath is from about 1 gram/liter to 20 grams/liter.

9. The method in accordance with claim 1, wherein said first bath has a pH of at least about 9.

10. The method in accordance with claim 1 further comprising rinsing the silane-coated metal surface with water prior to the step of contacting the silane-coated metal surface with said third bath.

* * * * *